TIME DERIVATIVE COMPUTER

Filed Oct. 6, 1965

INVENTOR,
MILFORD R. MURPHY
BY Harry M. Saragovitz
Edward J. Kelly, Herbert Berl
& Julian C. Keppler
ATTORNEYS 3,448,255
TIME DERIVATIVE COMPUTER

Milford R. Murphy, Arlington, Tex., assignor, by mesne assignments, to the United States of America as represented by the Secretary of the Army Filed Oct. 6, 1965, Ser. No. 493,596
Int. Cl. G06g 7/18
U.S. Cl. 235—183 7 Claims

ABSTRACT OF THE DISCLOSURE

A time derivative computer consisting essentially of a sampling circuit for periodically sampling the electrical analog of a time-variable signal, a holding circuit for storing the sampled value and a comparator for comparing the stored value with a value occurring a predetermined period of time after said sample is taken. The resultant output represents the change in the variable that has occurred during the increment of time.

This invention relates to means for computing derivatives. More particularly it relates to a circuit that takes the derivative of a function of time by effectively measuring the ratio of the increment of the function to the increment of the independent variable, e.g. time.

Many methods are presently being used to compute derivatives. These methods range from simple electromechanical devices to complex digital computers. The circuit of this invention requires no nulling or preparation prior to use as do the electromechanical units. Also, this circuit does not have a threshold problem. Furthermore, it has a resolution that is a function of the sampling period.

This invention electronically accomplishes the derivative function by periodically sampling the electrical analog of a variable of time, holding (storing) this value, $t$ seconds later comparing it with the present value of the variable, and hence measures the change (difference) in the variable that has occurred during the $t$ second increment. The storing time is kept short compared to the time constants of the remainder of the system in which it is being used. To simplify the computations, this device does not allow the increment of the independent variable to approach zero as a limit as in the case of a perfect derivative. Also, to simplify the implementation of this device, the time increment is kept constant. For convenience time is used herein as the independent variable.

An object of this invention is to provide an improved and simplified circuit for computing derivatives.

A further object of this invention is to provide means for computing derivatives which requires no nulling or preparation.

These and other objects and advantages of this invention will become apparent from the detailed description of the invention given in connection with the drawings in which.

Figure 1:
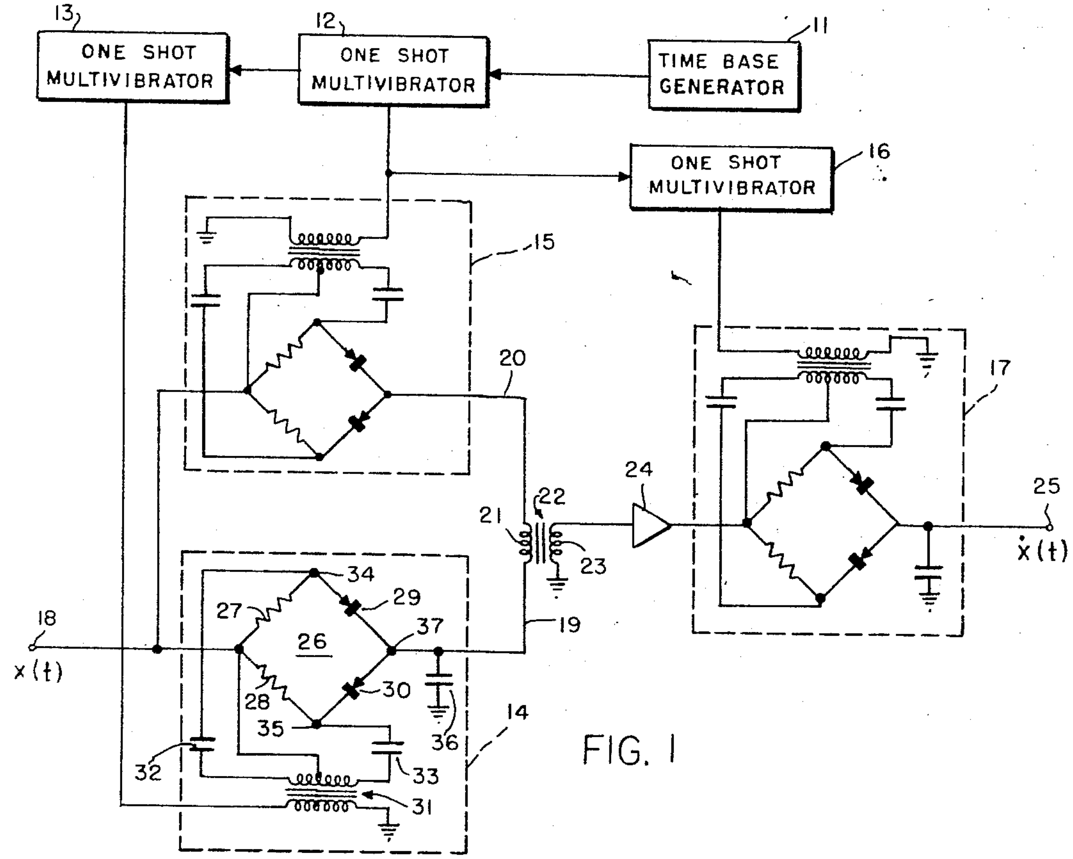
FIG. 1 shows a circuit diagram of a preferred embodiment of the invention.

FIG. 1 shows a time base generator 11 which drives a one shot multivibrator 12 which in turn drives a one shot multivibrator 13. The output from multivibrator 13 is connected to a sample and hold circuit 14. A second output from multivibrator 12 is connected to a bilateral gate 15 and to a one shot multivibrator 16 which in turn controls a second sample and hold circuit 17 which operates in synchronism with the bilateral gate 15. A signal designated $x(t)$ appears at input terminal 18 which is connected to both the bilateral gate 15 and the sample and hold circuit 14. Outputs from the sample and hold circuit 14 and the bilateral gate 15 are connected over lines 19 and 20 respectively to opposite terminals of the primary winding 21 of a transformer 22. The secondary winding 23 is connected by an amplifier 24 to the sample and hold circuit 17, the output of which appears at terminal 25.

The bilateral gates, multivibrators and time base generator are conventional circuits. The sample and hold circuit 14 will be briefly described to assist in the understanding of the overall time derivative computer. The input terminal 18 is connected to a bridge 26 which comprises resistors 27 and 28 and diodes 29 and 30. A control signal from multivibrator 13 is coupled by a transformer 31 and the capacitors 32 and 33 to points 34 and 35 of the bridge 26. A capacitor 36 is connected between the bridge output terminal 37 and ground. When a pulse from the multivibrator 13 biases the diodes 29 and 30 in the forward direction, the signal appearing at input terminal 18 passes through the bridge to the capacitor 36 where it is stored. The sample and hold circuit 17 is the same as circuit 14, but the bilateral gate 15 differs from the sample and hold circuits in that there is no storage device such as capacitor 36 associated with it.

The length of time between samples is established by the time base generator 11. Multivibrator 13 establishes the sampling period for the sample and hold circuit 14, while multivibrator 12 establishes the length of time (sampling period) that the bilateral gate 15 is opened.

The sequence of operation for a cycle will now be considered. Assume that the sample and hold circuit 14 is storing at capacitor 36 the last value sampled, e.g. $x_1$ at $t_1$. After T seconds the time base generator 11 again generates a pulse, at $t_2$ for example, which keys multivibrator 12. This multivibrator opens the bilateral gate 15 for a short period, e.g. $T_1$ seconds, which connects sample $x_2$ to the transformer primary winding 21. The other terminal of the winding 21 is connected to sample and hold circuit 14 which has stored the value of $x_1$ across capacitor 36. Therefore a voltage having a value of $x_1-x_2$ is applied across winding 21 for a duration of $T_1$ seconds. The output of the transformer is a pulse the magnitude of which represents the change in the input signal $x(t)$ during the period T in units of magnitude per unit of time. This pulse is then amplified and applied to the sample and hold circuit 17 which is in an open state since it is operated synchronously with the bilateral gate 15. The function of circuit 17 is to sample and hold this applied pulse. This output, $\dot{x}(t)$, which appears at terminal 25 is updated each time the time base generator 11 fires.

To complete the cycle, the sample and hold circuit 14 must be reset. When the multivibrator 12 returns to its normal state, it keys the multivibrator 13 which in turn operates the sample and hold circuit 14 to store another value of $x(t)$, for example, $x_2$. Multivibrator 12 has a relatively short period of operation, but it is not critical as long as it remains constant.

Figure 2:
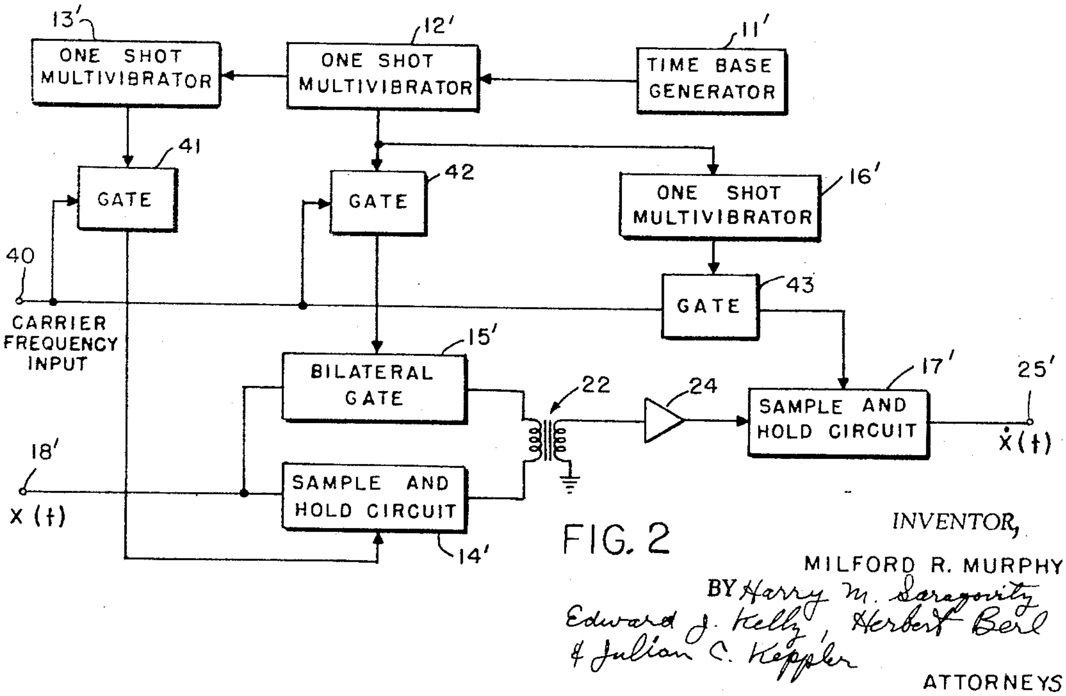
FIG. 2 shows a modification of the circuit of FIG. 1 which enables the system to operate with a carrier frequency.

FIG. 2 illustrates that the basic system can be easily made to operate with a carrier frequency signal. Elements which also appear in FIG. 1 have primed reference numerals. In addition to the circuitry shown in FIG. 1 is a carrier frequency input 40 which is connected to gates 41, 42 and 43. The control inputs to theses gates are supplied by multivibrators 13', 12' and 16' respectively. When these gates are opened by a pulse from an associated multivibrator, a burst of carrier frequency energy is applied to the associated sample and hold circuit 14' or 17' or the bilateral gate 15', depending on which gate is opened. This arrangement has several advantages. It will take the derivative of $x(t)$ whether it is a modulated carrier or a basic signal. Also, it permits small transformers to be used in the system even though the sampling periods are long, for example 100 milliseconds.

What is claimed is:

1. A time derivative computer comprising: a signal input terminal; first and second gating circuits each having a signal terminal, a control terminal and an output terminal; said signal terminals being connected to said signal input terminal; means connected to the output terminal of said first gating circuit for storing the signal output therefrom; differential means connected to the output terminals of both of said gating circuits for producing a signal which is proportional to the difference between the outputs from said first and second gating circuits; means connected to said first gating circuit control terminal for opening said first gating circuit for a short period of time; and means connected to the control terminal of said second gating circuit for opening said second gating circuit for a short period of time after first gating circuit has closed.

2. A time derivative computer as described in claim 1 wherein said differential means comprises a transformer, the opposite ends of the primary winding of which are connected respectively to the output terminals of said first and second gating circuits, the secondary winding of said transformer being connected to an amplifier.

3. A time derivative computer as described in claim 2 which further comprises: a third gating circuit having signal and control input terminals and an output terminal, the signal terminal of said third gating circuit being connected to the output of said amplifier; a second signal storage means connected to the output terminal of said third gating circuit; and means connected to the control terminal of said third gating circuit for opening said third gating circuit in synchronism with said second gating circuit.

4. A time derivative computer comprising: a signal input terminal; first and second gating circuits each having a signal terminal, a control terminal and an output terminal; said signal terminals being connected to said signal input terminal; means connected to the output terminal of said first gating circuit for storing the signal output therefrom; differential means connected to the output terminals of both of said gating circuits for producing a signal which is proportional to the difference between the outputs from said first and second gating circuits; first one shot multivibrator means for applying a control pulse to said first gating circuit; second one shot multivibrator means for applying a control pulse to said second gating circuit and for triggering said first multivibrator means upon the cessation of the pulse generated by said second multivibrator means; and a time base generator connected to said second multivibrator means.

5. A time derivative computer comprising: a signal input terminal; first and second gating circuits each having a signal terminal, a control terminal and an output terminal said signal terminals being connected to said signal input terminal; means connected to the output terminal of said first gating circuit for storing the output signal therefrom; a transformer having a primary winding, the terminals of which are respectively connected to the output terminals of said first and second gating circuits; an amplifier, the secondary winding of said transformer being connected to said amplifier; a third gating circuit having signal, control and output terminals, said third gating circuit signal terminal being connected to the output of said amplifier; second signal storage means connected to said third gating circuit output terminal; first one shot multivibrator means for applying a control pulse to said first gating circuit control terminal; second one shot multivibrator means for applying a control pulse to said second gating circuit control terminal and to said first multivibrator means for triggering said first multivibrator means upon the cessation of the pulse generated by said second multivibrator means; third one shot multivibrator means having input terminals connected to be responsive to the output of said second multivibrator means and having output terminals connected to the control terminal of said third gating circuit for applying a control pulse to said third gating circuit in synchronism with the control pulse applied to second gating circuit; and a time base generator connected to said second multivibrator means.

6. A time derivative computer comprising: a signal input terminal; first and second gating circuits each having a signal terminal, a control terminal and an output terminal; said signal terminals being connected to said signal input terminal; means connected to the output terminal of said first gating circuit for storing the signal output therefrom; differential means connected to the output terminals of both of said gating circuits for producing a signal which is proportional to the difference between the outputs from said first and second gating circuits; first and second gates having their outputs connected to the control terminals of said first and second gating circuits respectively; a carrier frequency signal source connected to said first and second gates; first one shot multivibrator means for applying a control pulse to said first gate; second one shot multivibrator means for applying a control pulse to said second gate and for triggering said first multivibrator means upon the cessation of the pulse generated by said second multivibrator means; and a time base generator connected to the input of said second multivibrator means.

7. A time derivative computer comprising: a signal input terminal; first and second gating circuits each having a signal terminal, a control terminal and an output terminal; said signal terminals being connected to said signal input terminal; means connected to the output terminal of said first gating circuit for storing the output signal therefrom; a transformer having a primary winding, the terminals of which are respectively connected to the output terminals of said first and second gating circuits; an amplifier, the secondary winding of said transformer being connected to said amplifier; a third gating circuit having signal, control and output terminals, said third gating circuit signal terminal being connected to the output of said amplifier; second signal storage means connected to said third gating circuit output terminal; first, second and third gates having their outputs connected to the control terminals of said first, second and third gating circuits respectively; a carrier frequency signal source connected to said first, second and third gates; first one shot multivibrator means for applying a control pulse to said first gate; second one shot multivibrator means for applying a control pulse to said second gate and for triggering said first multivibrator means upon the cessation of the pulse generated by said second multivibrator means; third one shot multivibrator means connected to said second multivibrator means and to said third gate for applying a control pulse to said third gate in synchronism with the control pulse applied to said second gate; and a time base generator connected to the input of said second multivibrator means.

References Cited

UNITED STATES PATENTS

| | | | |
|---|---|---|---|
| 2,794,173 | 5/1957 | Ramey | 333—19 |
| 2,959,691 | 11/1960 | Zoerner et al. | 333—19 X |
| 3,316,394 | 4/1967 | Fluhr | 235—183 |

MALCOLM A. MORRISON, *Primary Examiner.*

FELIX D. GRUBER, *Assistant Examiner.*

U.S. Cl. X.R.

235—150.51; 307—229, 247; 328—127